United States Patent
Boodaghians et al.

(10) Patent No.: US 8,742,364 B2
(45) Date of Patent: Jun. 3, 2014

(54) SYSTEMS AND METHODS FOR DISINFECTING WATER

(75) Inventors: Razmik B. Boodaghians, Glendale, CA (US); Jeff Lassegard, Aliso Viejo, CA (US)

(73) Assignee: MAG Aerospace Industries, Inc., Carson, CA (US)

( * ) Notice: Subject to any disclaimer, the term of this patent is extended or adjusted under 35 U.S.C. 154(b) by 637 days.

(21) Appl. No.: 12/872,420

(22) Filed: Aug. 31, 2010

(65) Prior Publication Data

US 2012/0051977 A1 Mar. 1, 2012

(51) Int. Cl.
*C02F 1/32* (2006.01)

(52) U.S. Cl.
USPC .................. 250/436; 250/438; 422/186.3

(58) Field of Classification Search
CPC .... C02F 1/32; C02F 1/325; C02F 2201/3223; C02F 2201/3225
USPC ................ 210/748.1–748.16, 192, 205, 241, 210/242.1; 422/186.3; 250/432 R, 435, 436, 250/437, 438
See application file for complete search history.

(56) References Cited

U.S. PATENT DOCUMENTS

| | | | | |
|---|---|---|---|---|
| 5,112,370 A | * | 5/1992 | Gazzano | 422/121 |
| 5,334,905 A | * | 8/1994 | Ullrich | 250/436 |
| 5,471,063 A | * | 11/1995 | Hayes et al. | 250/436 |
| 5,573,666 A | * | 11/1996 | Korin | 250/432 R |
| 5,919,422 A | | 7/1999 | Yamanaka et al. | |
| 6,454,952 B1 | | 9/2002 | Thorpe | |
| 6,707,048 B2 | | 3/2004 | Hallett et al. | |
| 6,726,839 B2 | * | 4/2004 | Taylor, Jr. | 210/198.1 |
| 6,773,608 B1 | | 8/2004 | Hallett et al. | |
| 7,081,225 B1 | * | 7/2006 | Hollander | 250/436 |
| 2002/0046569 A1 | | 4/2002 | Faqih | |
| 2003/0052277 A1 | | 3/2003 | Walker | |
| 2004/0055966 A1 | * | 3/2004 | Nguyen et al. | 210/748 |
| 2004/0219404 A1 | | 11/2004 | Gladstone | |
| 2005/0000913 A1 | * | 1/2005 | Betterly | 210/748 |
| 2005/0016907 A1 | | 1/2005 | Yuen | |
| 2005/0156119 A1 | | 7/2005 | Greene | |
| 2006/0231470 A1 | * | 10/2006 | Hatch et al. | 210/748 |
| 2007/0012883 A1 | * | 1/2007 | Lam | 250/436 |
| 2007/0131872 A1 | | 6/2007 | Shearer et al. | |
| 2008/0134899 A1 | * | 6/2008 | Subbarao et al. | 96/224 |
| 2010/0133155 A1 | | 6/2010 | Nolan | |

FOREIGN PATENT DOCUMENTS

| | | |
|---|---|---|
| BG | 1109 | 9/2008 |
| CA | 2686836 | 6/2010 |
| CN | 1951831 | 4/2007 |
| CN | 101391162 | 3/2009 |

(Continued)

OTHER PUBLICATIONS

Partial International Search Report dated Oct. 11, 2011 in related Application No. PCT/US2011/048882.

(Continued)

*Primary Examiner* — Lucas Stelling
(74) *Attorney, Agent, or Firm* — Kilpatrick Townsend & Stockton LLP; Kristin M. Crall, Esq.; Dean W. Russell, Esq.

(57) ABSTRACT

Embodiments of the present invention provide systems and methods for point of use location treatment of potable water supplies on demand on board passenger vehicles, such as aircraft. The systems described generally provide increased safety features, alternate ultraviolet light sources, and reduced power consumption.

23 Claims, 9 Drawing Sheets

(56) References Cited

FOREIGN PATENT DOCUMENTS

| | | |
|---|---|---|
| DE | 3414870 | 10/1985 |
| EP | 1541179 A1 | 6/2005 |
| KR | 20040073732 | 8/2004 |
| KR | 20120009918 A | 2/2012 |
| WO | WO 00/06499 | 2/2000 |
| WO | 2012030589 A2 | 3/2012 |

OTHER PUBLICATIONS

International Preliminary Report on Patentability dated Mar. 14, 2013 in Application No. PCT/US2011/048882.
International Search Report and Written Opinion dated May 4, 2012 in Application No. PCT/US2011/048882.
International Search Report and Written Opinion dated Sep. 19, 2013 in Application No. PCT/US2013/050605.

* cited by examiner

SYSTEMS AND METHODS FOR DISINFECTING WATER

BACKGROUND

1. Field of the Invention

Embodiments of the present invention generally relate to systems and methods for disinfecting water, and in particular, systems and methods for disinfecting potable water supplies on board passenger transportation vehicles and equipment, such as aircraft, trains, boats, ships, and the like. One embodiment particularly relates to systems and methods for disinfecting drinkable water at the point of use. Further embodiments relate to safety features that may be provided on systems for disinfecting water.

2. Description of Related Art

The issue of water quality, and in particular, of potable water quality, on passenger transportation vehicles and equipment, such as aircraft, trains, boats and ships, and the like is becoming more of a concern to regulatory authorities. This is particularly true in the United States with respect to the potable water supplies contained aboard commercial aircraft. Regulatory standards have been enacted that require water on board passenger vehicles to be disinfected according to certain standards. Passenger airlines must thus implement appropriate aircraft water disinfection protocols.

U.S. Pat. No. 4,871,452 to Kohler, et al., entitled "On-Board Water Supply," discloses equipment for purifying waste water from galleys, sinks, and toilets of aircraft. Waste water from these areas discharges to a tank, after which it passes through a mechanical filter, a bed of active carbon, ozone and osmotic stages, and a disinfection stage involving addition of chlorine and irradiation with ultraviolet ("UV") light. Thereafter, the water is made available to aircraft passengers for certain uses.

U.S. Pat. No. 6,143,185 to Tracy, et al. entitled "Treatment System for Aircraft Toilet Waster Water" discloses alternate systems for decontaminating waste water from aircraft toilets, sinks, and galleys. They too include a mechanical particulate filter, activated carbon, and a source of UV light. Alternatively, according to the Tracy patent, the waste water may be exposed to microwaves or treated with chlorine or iodine. A sensor may be used to measure "the level of clarity of the treated water as an indication of its purity" and restrict opening of a control valve until acceptable clarity levels are obtained.

However, these systems and methods are primarily directed at purifying wastewater removed from the aircraft. Airlines and other passenger transport vehicle companies must also ensure that the potable water (i.e., drinkable water) aboard the aircraft is fit for human consumption by employing appropriate disinfection protocols. But disinfection upon upload and periodic disinfection sampling does not always adequately address the issue of contamination introduced in uploaded water, which is of particular concern for aircraft flying to and from, and being serviced in, non-industrialized areas. In addition, air must be introduced into the water storage and dispensing system on the aircraft in order to maintain pressurization, as well as to drain the system during routine servicing. This air can introduce pathogens that can multiply and cause unsanitary conditions and unacceptable water quality in the intervals between samplings or disinfection procedures. In effect, because the water storage and dispensing system is routinely exposed to the outside environment, potable water quality cannot always be ensured without some form of additional treatment.

Continuous treatment of potable water supplies presents its own set of potential problems to be solved, including continuous or semi-continuous dosing of the water with the requisite dosing equipment (metering and monitoring equipment, dosing agent storage equipment, and/or equipment for in-situ generation of the dosing agent). Accordingly, attempts have been made to purify water while on-board an aircraft or other passenger vehicles directly at the point of use. For example, U.S. Publication No. 2010/0133155 to Nolan entitled "Water Distribution System With Dual Use Water Treatment Unit" discloses systems for treating water by irradiation with UV light, along with an activated carbon or sediment filter. The water is either treated on upload or at the point of use. Other attempts to treat water have occurred at the point at which water leaves the on-board water tank, before it travels to the point of use location.

However, there remains a need in the art for systems and methods for point of use treatment of potable water supplies to purify the dispensed water supplies, and related safety features and improved UV light sources.

BRIEF SUMMARY

Embodiments of the invention provide a single pass point of use ultraviolet (UV) light source drinking water treatment system for treating drinking water on board aircraft or other passenger vehicles. UV light is an excellent disinfectant for many microorganisms. In fact, some important organisms, such as *Cryptosporidium*, are resistant to chlorine disinfection (the most predominant disinfection approach). UV light technology accordingly is being employed to address this in many water treatment plants.

The systems described herein are used to treat water from a water source, prior to delivery to the end user through a faucet or other water-dispensing system. The systems are typically located at or near the point at which the water is to be used (e.g., at or near a faucet), and are thus referred to as "point of use" systems. Treating water on-demand results in lowered power consumption and related increased cost-savings.

Various safety features are also provided, e.g., features that prevent UV light from escaping during operation, which prevents creation of a hazardous condition under operational and maintenance conditions, as well as features that protect the end user in the event of internal component breakage. The systems described are particularly useful on board passenger transport vehicles, such as aircraft, trains, boats, ships, and the like.

Specifically, there is provided a compact and lightweight unit that provides various features, non-limiting examples of which include various combinations of one or more inventive UV LED light source(s), UV power supply features, and UV sensor technologies delivering the optimum synergy for the eradication of waterborne pathogens without the use of chemicals. The absence of water treatment chemicals prevents the formation of disinfection by-products that are considered harmful.

BRIEF DESCRIPTION OF THE DRAWINGS

FIGS. 11 A and B show alternate embodiments of textured surfaces that may be located on an inlet and/or outlet to the reaction chamber.

DETAILED DESCRIPTION

Figure 1:
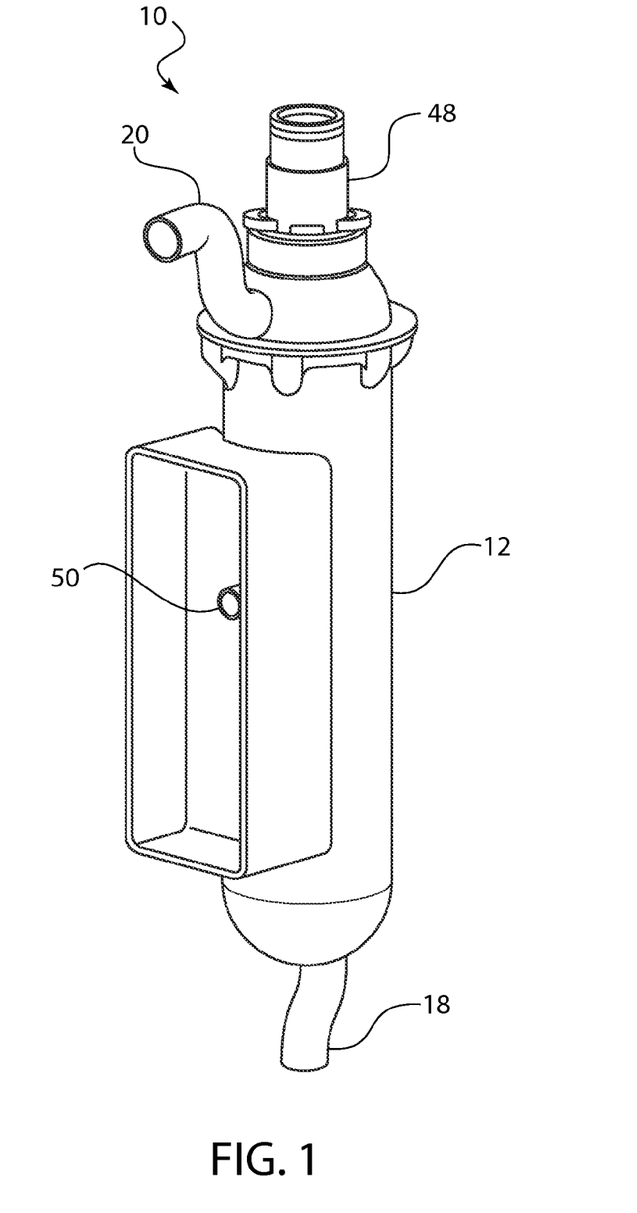
FIG. 1 shows a side perspective view of one embodiment of a point of use water treatment system.

FIG. 1 shows one embodiment of a point of use water treatment system 10. "Point of use" means that the system is used to treat water immediately prior to its consumption or use. "Immediately" means at least shortly prior to, although it is intended that at least a short duration of time between treatment and dispensing may be allowed. The point of use treatments described herein are intended to treat water (and in specific embodiments, drinking water, water intended for hand washing, or any other form of water that is desirably disinfected prior to use) at the location at which it is to be dispensed on demand. For example, embodiments may be located in cabinetry or otherwise directly at the water faucet location, as opposed to treating water on upload to the vehicle or treatment upon departure from on-board water tanks. (Water treated on upload may also need to be re-treated prior to its consumption due to its holding time in water tanks on board the vehicle.) The embodiments described herein provide point of use water treatment using ultraviolet (UV) light on board passenger transport vehicles, such as aircraft.

In certain embodiments, the system 10 has an enclosed UV reaction chamber 12 associated with a power supply and a UV sensor 50. Enclosed in reaction chamber 12 is a UV light source for treating water with a single pass on demand or otherwise as needed. Exemplary UV lights sources are described in more detail below.

The system 10 is generally constructed as a self-contained unit to be used as a point of use water treatment system. For example, the system 10 may be used as a potable drinking water treatment unit that is placed inside an aircraft (or other transportation vehicle) near the faucet in the cabin area. Specifically, it may be particularly convenient to mount the system inside the cabinetry used for the faucet assembly.

Figure 12:
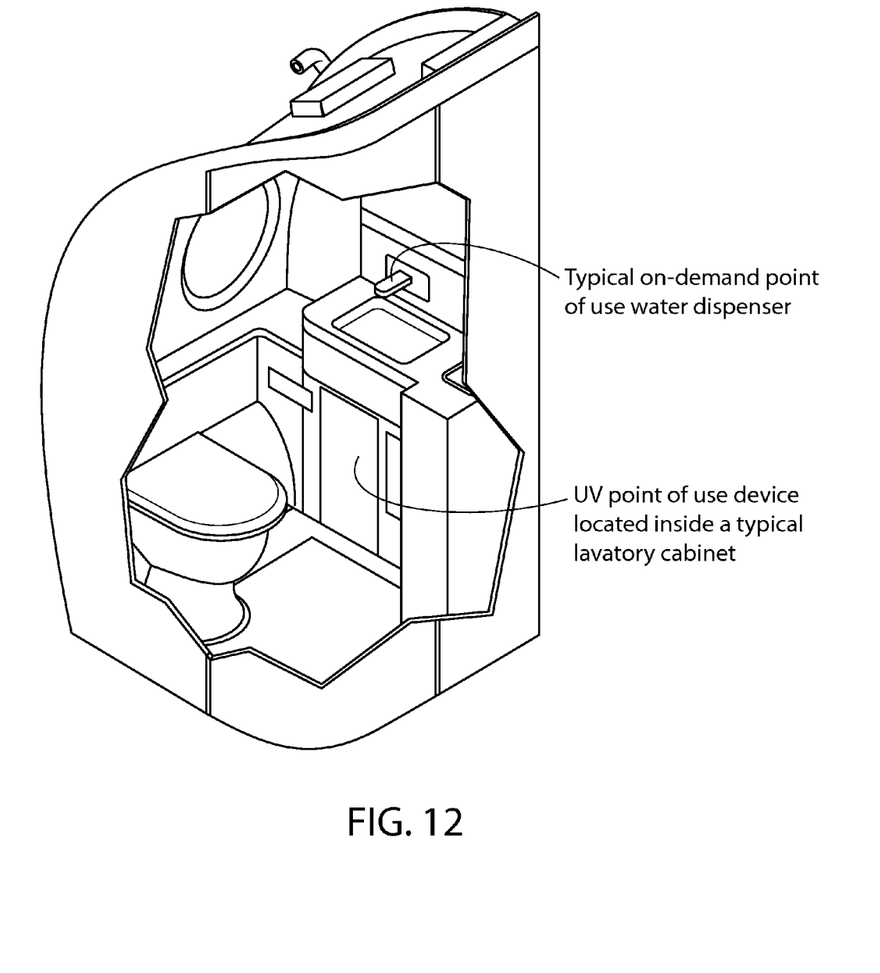
FIG. 12 shows an example of a potential point of use location for one embodiment of a water treatment system on board a passenger transport vehicle.

One example of an on demand water system that provides treated water at the point of use location is shown in FIG. 12. In this embodiment, water flows from an opened tap, and the treatment system is positioned directly in line with the tap faucet. Water is not treated until the tap or faucet is opened. Upon activation or opening of the tap, the UV light source is activated and water begins to flow through the system, being treated on demand, directly at the point of use location. This can save or converse power by only treating water when needed. The UV light source is activated immediately prior to use, only when the water is needed for consumption, as opposed to being constantly activated for constant water treatment.

Referring now to the individual features of the system shown in FIG. 1, the reaction chamber 12 contains one or more germicidal UV light sources 14, which are typically housed inside a sleeve 16 (typically a quartz sleeve, but alternate sleeve options are within the scope of this invention and are described in more detail below). Water enters the treatment system 10 from a bottom inlet 18, flows through the chamber 12 as described below, and exits through top outlet 20, instantly ready for use. The internal workings of chamber may vary.

Figure 2:
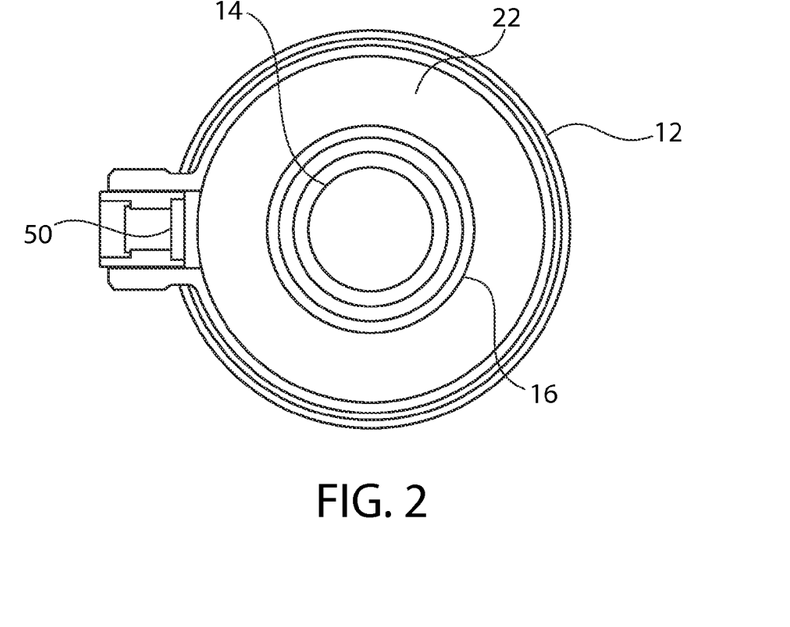
FIG. 2 shows a top cross-sectional view of a reaction chamber of a conventional water treatment system, into which various features of the improvements described herein may be implemented.

For example, in the embodiment shown in FIG. 2, water entering the chamber 12 is directed through a water flow space 22 positioned generally in the center of the chamber 12. Water flow space 22 is typically an annular tube, although it should be understood that any appropriate channel or configuration may be provided. In this example, a UV light source 14 is generally positioned within the water flow space 22 in order to treat the water. The UV light source 14 positioned inside the water flow space 22 is generally protected by a sleeve 16 (alternate options for which are described below). The water to be treated enters the water flow space 22, around the outside of the UV source 14 and sleeve 16.

Figure 3:
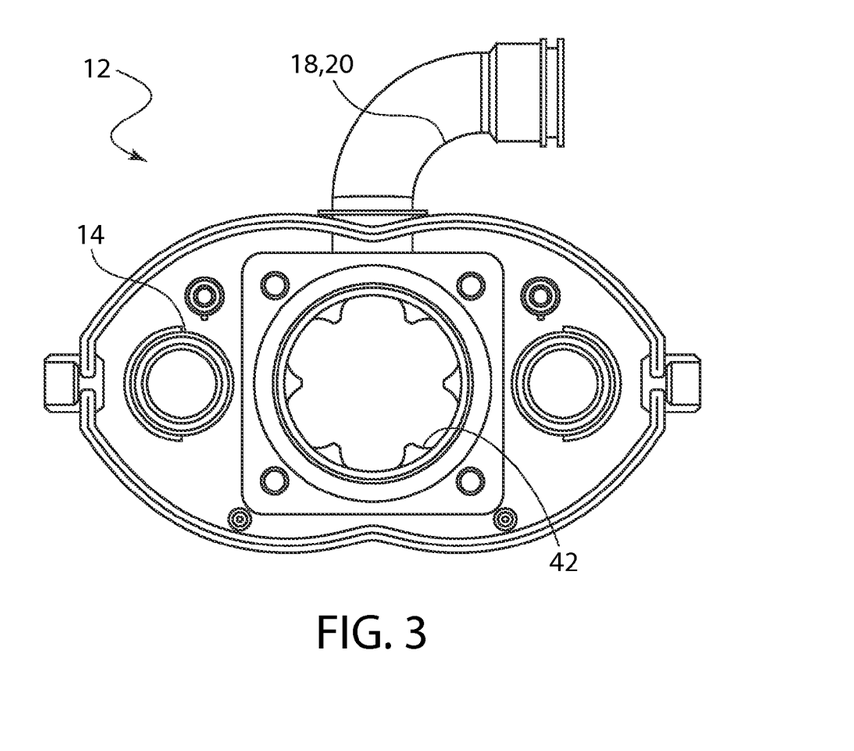
FIG. 3 shows a top cross-sectional view of an alternate embodiment of a reaction chamber of a water treatment system, into which various features of the improvements described herein may be implemented.

Alternatively, in the embodiment shown in FIG. 3, water entering the chamber 12 is directed through a water flow space 22 positioned generally in the center of the chamber 12, and one or two (or more) UV light sources 14 may be positioned alongside each side of the water flow space 22 within the chamber 12, in order to treat the water. Although two UV lights sources 14 are shown and described, it should be understood that only a single UV source or more than two sources may be used in this option.

UV light sources 14 are typically referred to as UV lamps. The UV lamps are typically enclosed by sleeves 16 to protect the lamps and help reflect light. Alternate options for different UV light sources and varying sleeves are described below and are considered within the scope of this invention.

In either of these reaction chamber embodiments, one or more reflectors 24 may be positioned near or against the chamber wall 26 to help light reflection and enhance treatment. The reflector 24 may be a removable sleeve or liner inside the chamber 12, and may be made of any appropriate reflective material, whether metal or non-metal. For example, exemplary reflectors may be made of ceramics or polymers, or may have coatings of ceramics or polymers, or specifically, may have polymeric coatings with a high gloss finish. Alternate reflectors may be anodized aluminum-based, with or without the described coatings. In one embodiment, there may be provided an anodized coating that may have at least a portion stripped away in order to obtain conductivity and ground the unit for safety. In other words, the reflector can be etched to establish a conductivity point. Even in the instance where a high gloss finish is used, there may be an etched portion to establish a contact point.

The general intent for the reflectors is to provide as much reflection of the UV light back into the system as possible. Reflectors of varying thicknesses may be provided in order to tailor the most optimal reflectivity angle (as reflectance will vary based on the wavelength of the light).

The reaction chamber 12 itself may be manufactured of any appropriate material, non-limiting examples of which include stainless steel, reinforced/composite material, polymers, fluoroethylenepropylene (FEP), polytetrafluoroethylene (PTFE), carbon fiber, carbon fiber-reinforced polymer or carbon fiber-reinforced plastic (CFRP or CRP), polyetheretherketone (PEEK), coated or anodized aluminum, acrylonitrile butadiene styrene (ABS), glass-reinforced plastic (GRP), perfluoralkoxy (PFA), ethylenetetrafluoroethylene copolymer (ETFE), or any other appropriate material having structural integrity and approved for drinking water contact.

The UV light source 14 may be any appropriate UV light source used in water treatment applications. They may be low or high pressure UV lamps. They may be standard UV bulbs or they may be light-emitting diode sources, as described herein. In specific embodiments, the UV lamp filament(s) may have a preheat configuration that compliments the UV power supply, which in turn has a preheat function. The combined features add to the reliability and durability of the treatment system for on-demand applications, meaning multiple starts.

UV water disinfection typically uses a UV light source enclosed in a transparent protective sleeve. The light is mounted so that as water passes through a flow chamber, UV rays are admitted and absorbed into the water stream. When UV energy is absorbed by the reproductive mechanisms of bacteria and viruses, the genetic material (DNA/RNA) is rearranged so that they can no longer reproduce, killing the bacteria and eliminating the risk of disease. UV treatment thus disinfects water without adding disinfection chemicals.

Figure 5:
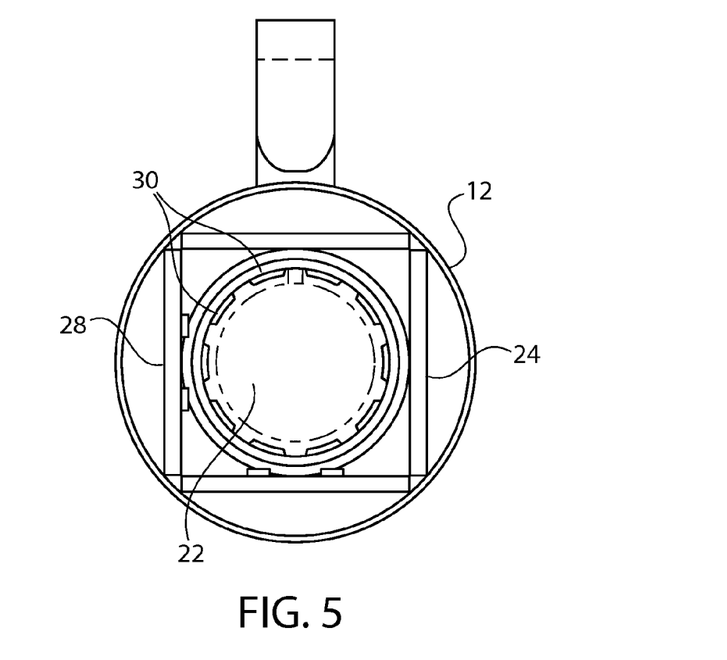
FIG. 5 shows a top cross-sectional view of one embodiment of a reaction chamber having LED components and reflectors.

In one embodiment, the UV light source may be provided as light-emitting diodes (LEDs) that are positioned anywhere in the reaction chamber, as long as they are able to emit light having a disinfection wavelength to the water being treated. The LEDS may either be positioned inside the water flow (in a configuration similar to that shown in FIG. 3) or positioned outside the water flow (as shown in FIG. 5). The general goal is to expose the water in the flow passage to the UV LED wavelength. Any geometry that allows the LEDs to be arranged around or in the water is considered within the scope of this invention.

For example, as shown in FIG. 5, the UV light source may be provided as a set of one or more light emitting diode (LED) units 28. The LEDs 30 themselves are manufactured to emit light in the ultraviolet range. They may be provided as individual LEDs 30 arranged in various positions directly on the chamber wall 26, on or against water flow space 22, or they may be arranged on units 28 as shown. If arranged on units 28, one or more sides of the unit 28 may be provided with a reflective surface 32 in order to help reflect to UV light emitted more effectively.

The UV LEDs may be positioned in any desired configuration. One example is the box-shaped configuration shown in FIG. 5, which is formed by two L-shaped units of FIG. 4. In the L-shaped embodiment shown, one or both panels 34 may be provided with a reflective surface 32. In one specific use, the units 28 may be positioned around the water flow space 22 at angles to one another so that a box-shaped unit is formed.

Figure 4:
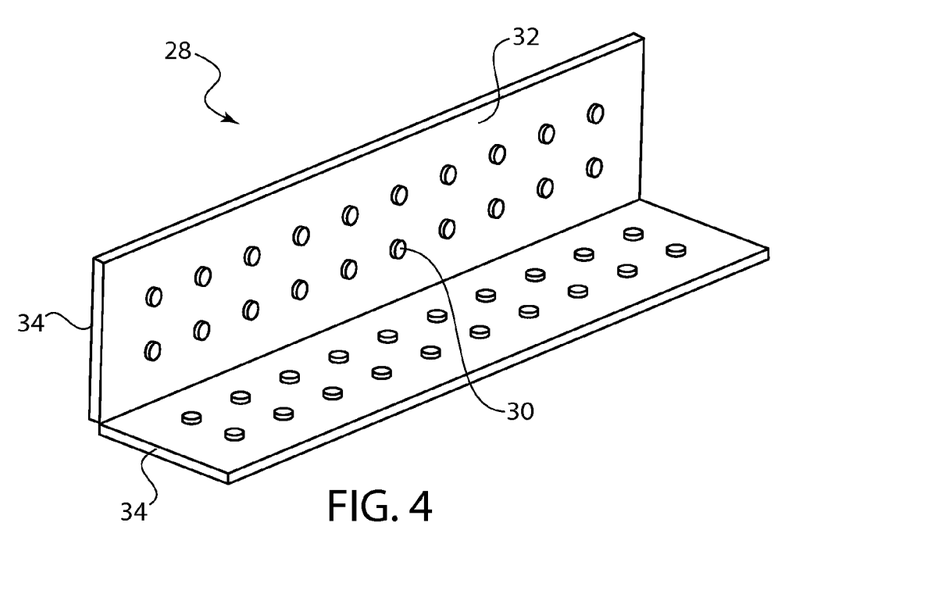
FIG. 4 shows a perspective view of one embodiment of an LED UV light source.

Alternate configurations are possible and within the scope of this invention. For example, although an L-shaped LED unit 28 and a box-shaped configuration are shown, it should be understood that any appropriately shaped unit may be used and is considered within the scope of this invention. For example, the unit 28 may be provided as a cylindrical or partially cylindrical unit (e.g., a tubular unit, a circular, round or oval unit, or a half circle unit, two partially separated halves), a square or rectangular unit, single panels, a 3-sided triangular unit, or any other appropriately shaped unit. Moreover, although the LEDs 30 are shown as being provided in two rows, it should be understood that fewer or more rows may be provided or that the LEDs may alternatively be scattered in random patterns along one or more panels 34, along the inside wall of chamber, along the water flow space 22, or in any other appropriate position in chamber 12, as long as the LEDs are able to treat the water in the system.

In the specific embodiment shown, the design of the unit has an L-shape array of UV LEDs and a corresponding L-shaped reflector that emits UV light and reflects on to the water to be treated. The UV LED and reflector units may be used as structural components. This arrangement allows for the use of a larger quartz sleeve to maximize water flow rate. In other words, when a UV array is positioned on the outside of the water flow space, there is provided a larger passage for the water, which allows the water path to be larger, and as such, allows more water to be treated per pass.

If a traditional tubular UV lamp is used instead, such UV lamps are commonly enclosed in a quartz sleeve. One embodiment of the present invention provides alternate protective sleeves for the UV light source. One version of a protective sleeve is a polymer-based tube or sleeve 16 that replaces the quartz sleeve. In the polymer-based tube sleeve embodiment, the sleeve 16 is a rigid sleeve that houses the UV light source 14. The polymer-based tube sleeve 16 may have similar dimensions and features as a traditional quartz sleeve, it simply replaces the quartz tube with a polymer material. The polymer-based sleeve 16 transmits UV light at a specific wavelength. Non-limiting examples of materials that may comprise the polymer-based sleeve may include fluoroethylenepropylene (FEP), polytetrafluoroethylene (PTFE), or any other appropriate rigid materials having a high UV emissivity level.

A further version of a protective sleeve is a shrink wrap sleeve that is applied directly to the light source (and the light source may then be used with a traditional quartz sleeve or with a polymer tube sleeve). In the shrink wrap sleeve embodiment, the UV light source 14 is wrapped or coated by a polymeric shrink wrap sleeve or coating. For example, a shrink sleeve, wrap, or tube can be heat molded or otherwise shrink-wrapped directly onto the light source. The shrink wrap sleeve may be manufactured of any appropriate material, such as fluoropolymers such as tetrafluoroethylene or polytetrafluoroethylene (PTFE/Teflon), (one example is manufactured by DuPont Co.), fluorinated ethylene propylene (FEP), or any other material having a high UV emissivity level. In one specific embodiment, the radiation loss due to the shrink wrap film is typically not greater than 15%. These materials are used as heat shrink products and are transparent to UV-C. The general intent of this shrink wrap sleeve embodiment is that if the UV light source breaks or otherwise suffers physical damage, the contents of the broken lamp are trapped inside the heat shrink cover. Moreover, depending upon the thickness of the shrink wrap or coating, this embodiment may alleviate the need to provide any further element between the UV light source and the water to be treated.

A further optional safety feature is to provide a rubber mounted socket end where the UV lamp is mounted. This feature provides some "give" during installation, and more importantly, can resist potential impacts that may be suffered by the system due to sudden vehicle movements, while protecting the UV light source. A related safety option (that may be used in addition to or instead of the rubber mounted socket) is to provide a spring loaded socket end, which can also resist impact and protect the light source from breakage.

Figure 6:
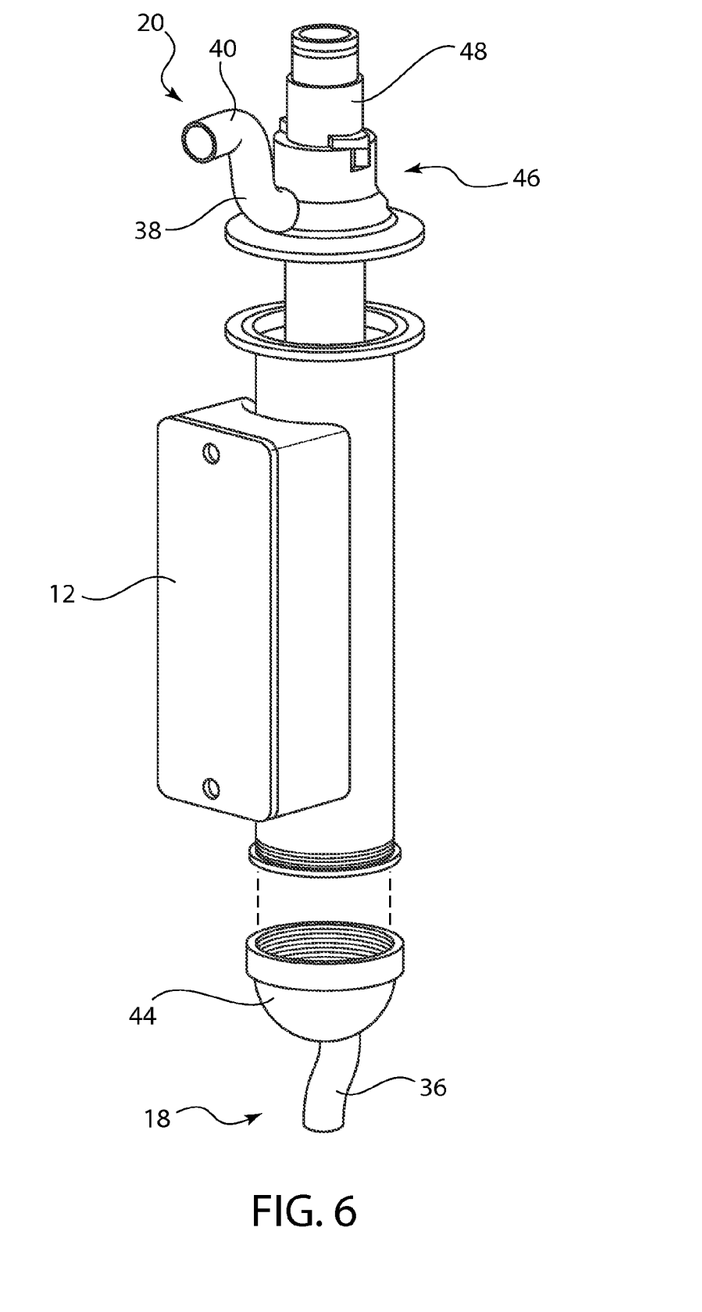
FIG. 6 shows a perspective exploded view of the water treatment system of FIG. 1.

As shown in FIG. 6, extending into and out of reaction chamber 12 is an inlet 18 and an outlet 20. Inlet 18 is in fluid communication with a water source, such a water tank or a water holding area, and is configured to deliver water to the chamber 12. Outlet 20 extends out of the chamber 12, and its free end is in fluid communication with a water-dispensing apparatus, such as a plumbing pipe leading to a faucet, spigot, or any other appropriate mechanism designed to deliver water to the end user.

Inlet 18 and outlet 20 are generally tubular or circumferential in nature. In one embodiment, inlet 18 is configured with at least one bend 36, curve, or portion having a non-linear dimension along its length in order to prevent line of sight to the UV light source contained within the reaction chamber 12. Outlet 20 is also configured with at least one bend 38, curve, or portion having a non-linear dimension along its length in order to prevent line of sight to the light source contained within the reaction chamber 12. The bends 36, 38 (or curves or non-linear portions) of this design are primarily intended to protect maintenance personnel or anyone else who may come into direct contact or otherwise have their eyes positioned at or near inlet 18 or the outlet 20 from being directly subjected to the UV light. The bends 36, 38 prevent the UV light source from being immediately viewable, causing the light to refract and take differing paths along the inlet and outlet portions.

The general goal is to provide UV light entrapment to prevent any accidental harm during maintenance and installation. In a specific embodiment, the inlet and/or outlet may have multiple bends, for example, at least a first bend and a second bend, which further act to eliminate line of sight into the chamber 12. In the embodiment shown in FIG. 6, outlet 20 has a first outlet bend 38 and a second outlet bend 40. The second bend 40 may help attenuate any light that may escape past the first bend 38.

In a further embodiment, inlet 18 and outlet 20 are provided with interior surfaces having a UV light entrapment feature or safety feature, such as a safety coating. "UV light entrapment feature" or "safety feature" or "safety coating" means any type of feature or coating or material that either absorbs, attenuates, scatters, or otherwise lessens light that would otherwise reach a potential viewer if safety coating is not in place. In a specific embodiment, the coating is designed for UV light attenuation. For example, one embodiment of a safety coating is a coating that is a light absorbent coating, such as polyurethane, acrylic, any appropriate light-absorbing polymer coating, a dark painted coating, blue black coatings, or any other coating having light-absorbing qualities or otherwise acts to absorb visible light, and specifically, UV light.

Figure 11A:
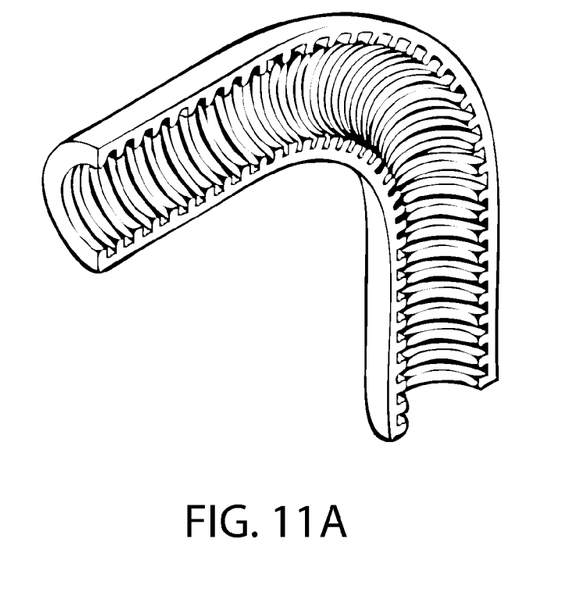
Figure 11B:
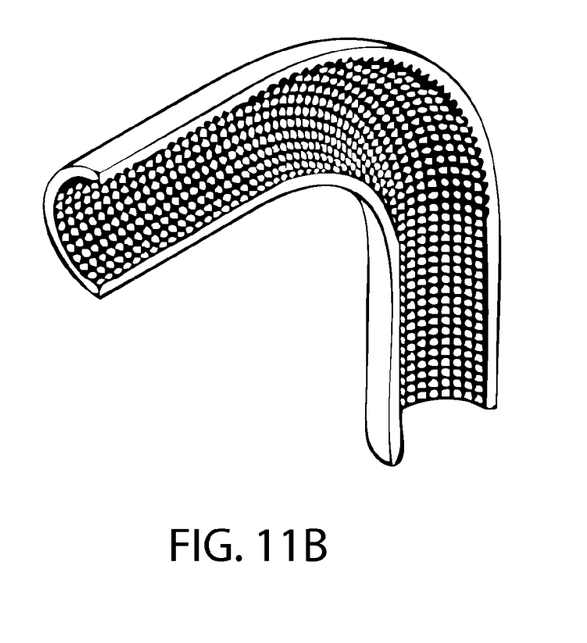

A further example of a safety coating is a rough or textured coating that acts to scatter and/or spread light. For example, the interior surfaces may have ridges, bumps, undulations, chevrons, sanding, honeycomb, raised protrusions, indented features or any other appropriate light-scattering features that impart a light-scattering quality to the surface or otherwise acts to scatter or spread visible light, and specifically, UV light. Non-limiting examples of alternate textured coating embodiments are shown in FIGS. 11A and 11B.

Appropriate safety coatings may either be materials that are painted, sprayed, dipped, filled, or otherwise directly applied to interior surfaces. Alternatively, safety coatings may be provided as a sleeve, insert, tubing, or some other material that is positioned inside the inlet 18 and/or outlet 20 abutting interior surfaces. In a specific embodiment, the safety coating may be a polymer member (such as a tube or sleeve or any other shaped member) that slides into inlet 18 and/or outlet 20. Polymer tube may have a rough or a smooth surface and may be manufactured from an appropriate safety coating material and/or may have any other appropriate safety coating applied thereto. The materials or coatings used are intended to confer safety benefits. Moreover, because they come into direct contact with drinking water, they should all be approved for drinking water contact.

The system 10 is typically provided with a minimal number of components and in certain embodiments, has a modular construction, as shown in FIG. 6. A modular construction provides increased ease of maintenance and replacement. In one embodiment, the modular construction is provided by three main components: a removable lower cap 44 comprising an inlet 18, reaction chamber 12, and removable upper cap 46 comprising an outlet 20 and a lamp housing 48. However, it should be understood that the modular components may be provided alternatively as desired. The modularity provided by removable lower cap 44 and removable upper cap 46 allows easier cleaning, maintenance (e.g., disassembly and reassembly), and access to the UV lamp. The caps may be secured to the chamber 12 by any appropriate mechanism, such as threaded, bolted, clamped, or any other securing means.

Figure 7:
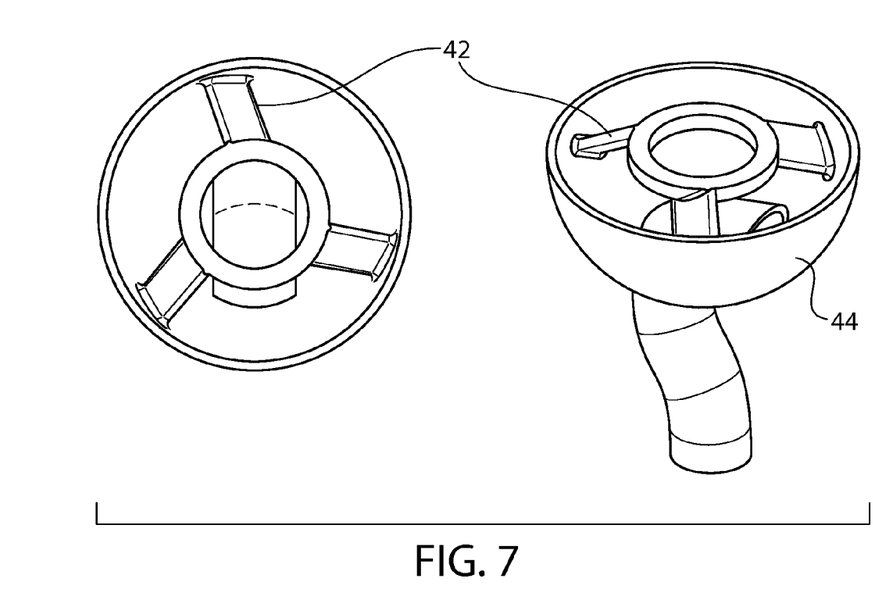
FIG. 7 shows a top and perspective cut away view of one embodiment of a lower cap for use in connection with a modular water treatment system.

As shown in FIG. 7, water inlet 18 may have one or more turbulence inducing fins 42. In the specific embodiment shown, fins 42 are provided on the inside of lower cap portion 44, and are intended to introduce turbulence into the water entering the water flow space 22. Causing agitation of the water and creating a vortex helps ensure circulation of the molecules in the water and distribution of the UV light through all water in the system. The turbulence also keeps the water in the water flow space 22 for a longer time, allowing for a lengthened treatment time.

Figure 8:
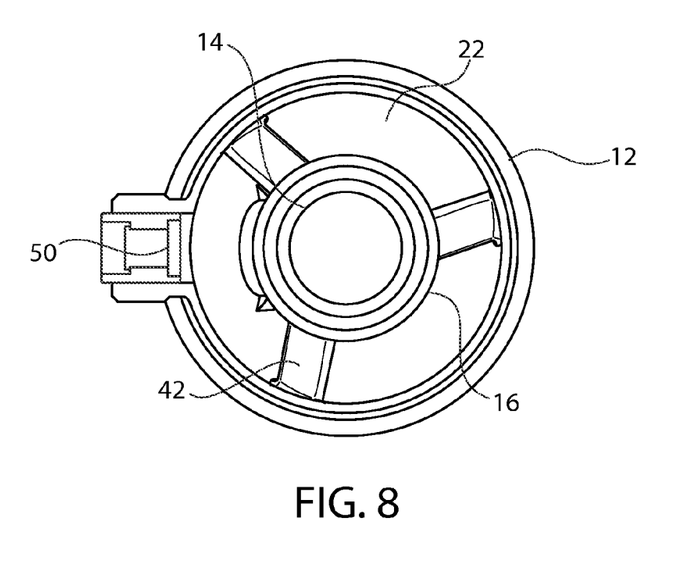
FIG. 8 shows a top cross sectional view of a water treatment system having a tripod system to secure and hold a UV bulb.
Figure 9:
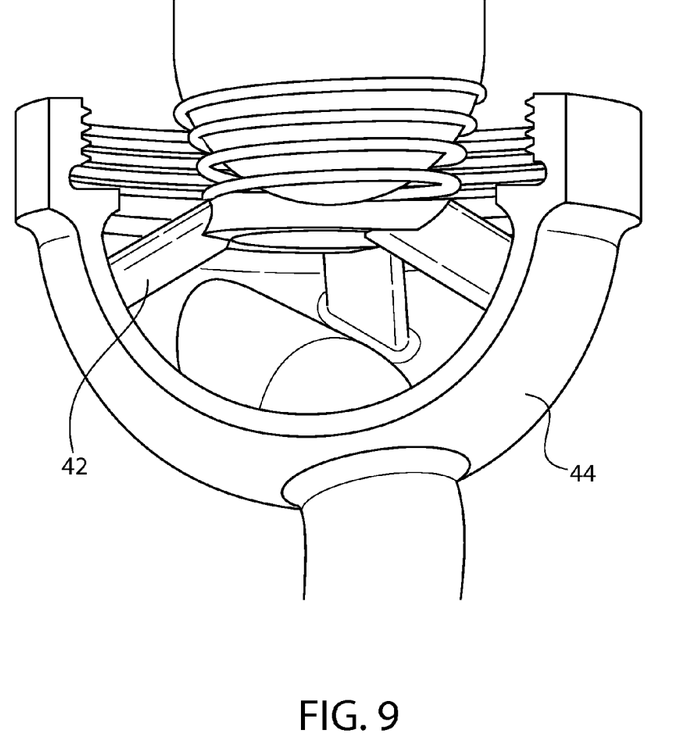
FIG. 9 shows a side sectional view of the water treatment system of FIG. 8.
Figure 10:
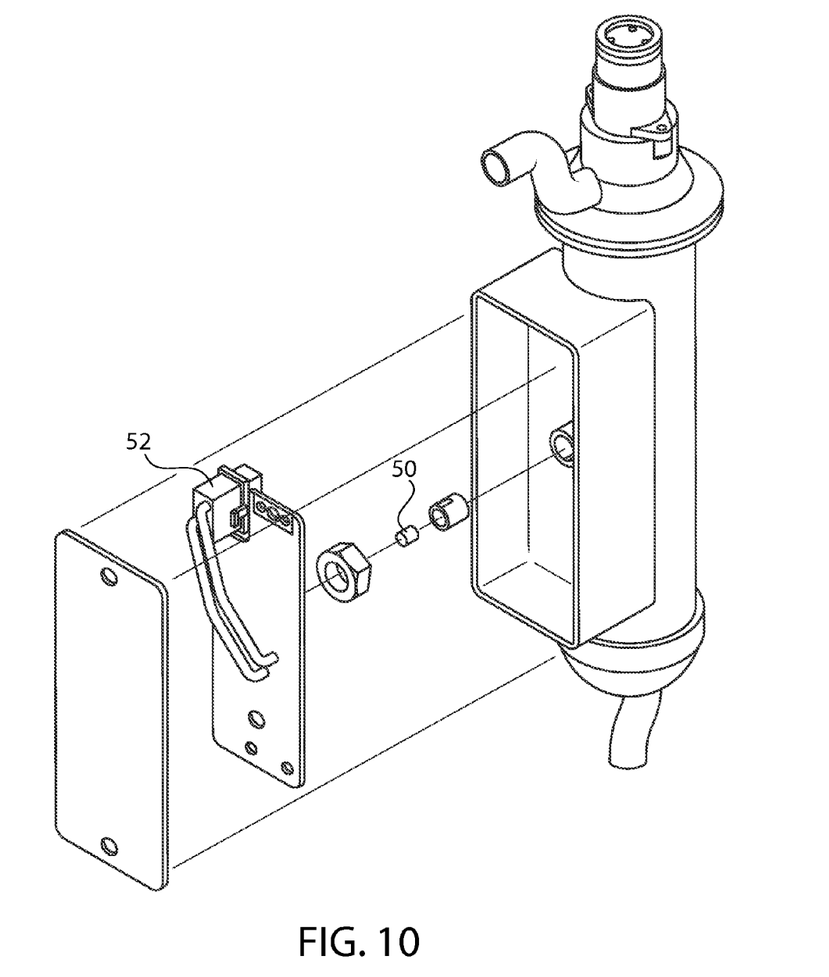
FIG. 10 shows a perspective view of further safety features of the water treatment system of FIG. 1.

The fins 42 may serve the additional (or alternate) function of supporting a UV lamp. In one embodiment, fins 42 are secured to the sides of cap portion 44, as shown in FIGS. 8 and 9. In this feature, the fins 42 create turbulence while also supporting a UV light source, providing dual functions. In one embodiment, one or more springs may be associated with the tripod, typically at the tripod base, which absorb shock and support the free end of the sleeve and UV light source. In effect, the tripod/spring combination helps vibrationally isolate the UV light source by absorbing potential shock rather than transferring shock to the UV lamp.

FIG. 1 also shows an alternate embodiment of turbulence inducing fins 42, which are positioned in the interior of water flow space 22. Fins 42 are intended to induce turbulence and agitate water in the system. The quartz tube or other sheath of the UV lamp may rest on these fins or teeth for support as well.

Additional safety features that may be incorporated into other areas of the systems described herein are one or more UV sensors 50. The sensor(s) 50 are positioned such that dismantling of the unit when the UV light is on is prevented. In the embodiment shown in FIG. 8, the UV sensor 50 is positioned directly underneath the power supply and other electronics, so that it is physically impossible to dismantle the sensor 50 from the main body of the chamber. In other words, the sensor is positioned so that the power supply must be removed before the sensor can be dismantled. Power shut down is required prior to sensor removal. This eliminates the potential for UV exposure to personnel during maintenance.

A further safety feature that may be incorporated into various embodiments is a microswitch positioned on or near a portion that must be removed for UV bulb changes. For example, the microswitch may be positioned near the upper cap 46 and/or the lamp housing 48 so that removal of the upper cap 46 and/or the lamp housing 48 will automatically shut off the UV lamp.

In order to configure the water treatment systems described herein for use on passenger transport vehicles, such as aircraft shown in FIG. 11, it is necessary to design the systems so that they operate using about 22-32 VDC power input, and in specific embodiments, about 28 V DC input power. By contrast, most water disinfection equipment systems for home or commercial use plug into a power point of 115 volts or 220 volts, depending upon the local/regional main's supply. Accordingly, the power supply for aircraft UV lamp operation must be altered and a customized converter provided in order to bridge the gap between a traditional power supply and available aircraft power supply and facilitate the use of a UV lamp on an aircraft. The desired goal is to operate at or around 28 volts. These voltages are provided as non-limiting examples only, and it should be understood that alternate voltages may be used. The general concept to be protected is using the water treatment systems described herein at lower voltages than those used in typical off-the-shelf UV water treatment systems for home and/or office use. Such a power conversion device may be a ballast lamp 52, as shown in FIG. 8.

In one embodiment, the power supply is designed with a step-up converter circuit with an output AC voltage that is greater than its input DC voltage. The switching mode power supply contains a number of semiconductors, and at least one energy storage element with capacitors to reduce output voltage ripple. The mode of operation can be continuous or discontinuous. The circuit may incorporate an electronic output current limiter that effectively controls output current. The power and signal lines are filtered to reduce and/or eliminate electromagnetic interference via conducted and radiated emissions, and susceptibility to electromagnetic interference. The power supply may be designed with a safety interlock switch to turn off the input power when the reaction chamber is opened. Additionally, there may be provided a power supply safety-circuit that includes a GFCI protection mechanism or equivalent with a test button and reset button on the unit.

The power supply is specifically designed to match the power supply of an aircraft, which in many instances, uses about 28 V DC aircraft voltage input. In addition to supplying power for the UV lamp, the power supply also supplies power to the UV sensor(s) for monitoring the UV light intensity.

In a specific embodiment, the system is capable of operating at water inlet pressure of 29 psi with water flow rate of 4 liters per minute with an operational water temperature of 1° C. to 40° C. The disinfection unit should typically be operational at low ambient temperature of −15° C. and operational high ambient temperature of +55° C. with water flowing through the unit. The storage temperature may be −55° C. to +85° C. without water.

In use, the system is typically installed upright, in a vertical position, underneath a sink area, within a cabinet in an aircraft or other passenger vehicle in order to treat water for the flight(s) or trip(s). The inlet and outlet are curved such that water drains from the system via gravity. In other words, there are no U-bends or deep curves that will trap water when the system is not in use, causing issues with standing water freezing at low temperatures. The slightly curved, but non-water catching shapes of the inlet and outlet provide water drainage features that help avoid damage when the water treatment unit is idle at low ambient temperature. For example, the system allows water to drain freely in a parked aircraft in order to avoid potential damage due to water freezing inside the unit. The design may also employ a pressure and/or flow sensor and/or pressure switch to trigger the UV treatment device to function when the water flow has been established.

For example, activation of these sensors or switches indicates to the system that a user is ready to receive treated water. Activation of the flow of water causes activation of the UV light source, so that water flowing through the system is treated immediately upon demand. In other words, opening of the tap causes a pressure drop, which triggers the treatment system to activate UV treatment. When the tap is closed, the system remains off. By only powering up and treating water on demand, embodiments of the systems described herein conserve energy and maintain power efficiency, while still providing treated water on demand, at the point of use.

Changes and modifications, additions and deletions may be made to the structures and methods recited above and shown in the drawings without departing from the scope or spirit of the invention and the following claims.

What is claimed is:

1. A point of use water treatment system configured for use on board a passenger transport vehicle, comprising: (a) a reaction chamber comprising an inlet and an outlet; (b) a water flow space positioned inside the reaction chamber; (c) at least one ultraviolet light source positioned inside the reaction chamber; (d) a base for the into ultraviolet source comprising inwardly extending fins associated with one or more springs to form a central mount that helps to absorb shock and to render the ultraviolet light source more resistant to impact from sudden movement of the passenger transport vehicle.

2. The system of claim 1, further comprising at least one safety feature.

3. The system of claim 2, wherein the at least one safety feature comprises one or more ultraviolet light entrapment features, a rubber mounted socket end for mounting the ultraviolet light source, a safety sensor, a polymer material shaped and configured to house an ultraviolet light source, or any combination thereof.

4. The system of claim 3, wherein the one or more ultraviolet light entrapment features comprise a textured coating.

5. The system of claim 4, wherein the textured coating comprises a rough coating, ridges, bumps, undulations, chevrons, sanding, honeycomb, raised protrusions, or indented features that that impart a light-scattering quality.

6. The system of claim 3, wherein the one or more ultraviolet light entrapment features comprise a light absorbent coating.

7. The system of claim 6, wherein the light absorbent coating comprises one or more of polyurethane, acrylic, a light-absorbing polymer coating, a dark painted coating, blue black coatings, or a coating having light-absorbing qualities to absorb visible light.

8. The system of claim 3, wherein the one or more ultraviolet light entrapment features comprise a polymer sleeve configured to fit within the inlet or the outlet.

9. The system of claim 3, wherein the polymer material is provided as a polymer sleeve configured to replace a quartz sleeve.

10. The system of claim 3, wherein the polymer material is provided as a polymer shrink wrap sleeve configured to be wrapped, coated, or otherwise applied directly to an ultraviolet source.

11. The system of claim 3, wherein the polymer material comprises a fluoropolymer.

12. The system of claim 1, wherein the ultraviolet light source is positioned externally to the water flow space.

13. The system of claim 1, wherein the ultraviolet light source comprises one or more light-emitting diodes.

14. The system of claim 13, wherein the one or more light-emitting diodes are positioned on a unit external to the water flow space.

15. The system of claim 14, wherein the unit has one or more reflective surfaces.

16. The system of claim 14, wherein the unit is configured as a box-shaped unit.

17. The system of claim 1, wherein the water system is modular.

18. The system of claim 17, wherein the water system has a removable lower cap and a removable upper cap.

19. The system of claim 1, wherein the water system is capable operating with a passenger transport vehicle power outlet at or around 22-32 volts.

20. The system of claim 7, wherein the inwardly extending fins comprise turbulence inducing fins that extend from an inner side of the reaction chamber.

21. The system of claim 1, wherein the water system has a removable lower cap and a removable upper cap, and wherein the inwardly extending fins extend from the lower cap.

22. The system of claim 1, wherein the outlet comprises a first outlet bend nearest the reaction chamber and a second outlet bend at an outer end of the outlet, the second outlet bend changing direction from the first outlet bend.

23. A point of use water treatment system configured for use on board a passenger transport vehicle, comprising:
   (a) a reaction chamber comprising an inlet and an outlet, wherein the outlet comprises a first outlet bend nearest the reaction chamber and a second outlet bend at an outer end of the outlet, the second outlet bend changing direction from the first outlet bend to provide ultraviolet light entrapment;
   (b) a water flow space positioned inside the reaction chamber;
   (c) at least one ultraviolet light source positioned inside the reaction chamber; and
   (d) a central base for the ultraviolet source, wherein the central base comprises inwardly extending fins associated with one or more springs to form a central mount that helps absorb shock and assists in rendering the ultraviolet light source more resistant to impact from sudden movement of the passenger transport vehicle.

* * * * *